(12) United States Patent
Isogawa et al.

(10) Patent No.: US 7,153,926 B2
(45) Date of Patent: Dec. 26, 2006

(54) GOLF BALL AND PROCESS FOR PRODUCING THE SAME

(75) Inventors: Kazuhiko Isogawa, Kobe (JP); Koichi Fujisawa, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/942,865

(22) Filed: Sep. 17, 2004

(65) Prior Publication Data

US 2005/0079351 A1 Apr. 14, 2005

(30) Foreign Application Priority Data

Oct. 10, 2003 (JP) .............................. 2003-352764

(51) Int. Cl.
*C08G 18/48* (2006.01)

(52) U.S. Cl. ........................ 528/76; 473/357; 473/365; 473/372; 473/373; 473/385

(58) Field of Classification Search ................ 528/76; 473/357, 365, 372, 373, 385
See application file for complete search history.

(56) References Cited

U.S. PATENT DOCUMENTS 4,884,814 A  12/1989  Sullivan 5,066,762 A * 11/1991 Ohbuchi et al. .............. 528/85
6,123,628 A    9/2000 Ichikawa et al.
6,486,261 B1 * 11/2002 Wu et al. ................ 525/332.6

FOREIGN PATENT DOCUMENTS

EP  629721    * 1/1994
JP  2002-360741 A  12/2002

OTHER PUBLICATIONS

Szycher; Handbook of Polyurethanes; 1999; p. 11-9.*
JP-11-178949 Abstract only, corresponds to US Patent No. 6,123,628, Jul. 1999.

* cited by examiner

*Primary Examiner*—Rachel Gorr
(74) *Attorney, Agent, or Firm*—Birch, Stewart, Kolasch, and Birch, LLP

(57) ABSTRACT

Disclosed is a golf ball, which includes a core and a polyurethane cover covering over the core. A composition of the cover includes a thermoplastic polyurethane elastomer which contains, as its component, a compound having three or more reactive functional groups capable of reacting with an isocyanate group. The present invention can provide a golf ball having a cover excellent in abrasion resistance and resiliency.

22 Claims, No Drawings

GOLF BALL AND PROCESS FOR PRODUCING THE SAME

This Nonprovisional application claims priority under 35 U.S.C. § 119(a) on Patent Application No(s). 2003-352764 filed in Japan on Oct. 10, 2003, the entire contents of which are hereby incorporated by reference.

BACKGROUND OF THE INVENTION

1. Field of the Invention

The present invention relates to a golf ball having a polyurethane cover.

2. Description of the Background Art

There has been known a golf ball cover formed by ionomer resin or polyurethane as a base resin thereof. While a golf ball cover using ionomer resin is widely used by reason of its advantages in resilience, durability and processability, it is pointed out that its high rigidity and hardness causes problems, such as poor shot feeling, and inferior controllability due to difficulties in obtaining a sufficient spin performance. As one measure against this problem, Japanese Patent No. 2709950 discloses a technique of forming a golf ball cover using a blend of hard ionomer resin and soft ionomer resin to provide enhanced shot feeling and spin performance. The soft ionomer resin blended therein, however, inevitably causes deterioration in resilience and/or scratch or abrasion resistance. In view of the capability of providing enhanced shot feeling and/or spin performance as compared to ionomer resin, polyurethane is also used as a base resin of a golf ball cover.

The polyurethane for use as a base resin of a golf ball cover includes thermosetting polyurethane or thermoplastic polyurethane. The use of the thermosetting polyurethane allows a crosslinked structure to be formed so as to provide enhanced abrasion resistance in the cover. On the other hand, it involves a problem of deterioration in productivity due to complicated production processes, such as the need for adjusting its viscosity in a process of coating a golf ball core with the cover. In case of using the thermoplastic polyurethane, while a coating process can be performed by injecting a cover composition directly onto a core, so as to achieve excellent productivity as compared to the case of using the thermosetting polyurethane, the thermoplastic polyurethane having a straight-chain structure causes difficulties in obtaining sufficient abrasion resistance during ball hitting.

As measures against such a problem, Japanese Patent Laid-Open Publication No. 11-178949 proposes a golf ball with a cover formed by a product of the reaction between a thermoplastic polyurethane elastomer and an isocyanate compound. This technique involves difficulties in stably molding the cover, because the thermoplastic polyurethane elastomer is melted only at a high temperature, and the reaction with the isocyanate to be caused by mixing them under a high temperature is undesirably accelerated. Japanese Patent Laid-Open Publication No. 2002-360741 also proposes a golf ball with a cover formed by a mixture of a thermoplastic polyurethane elastomer and a thermoplastic polyamide elastomer. This technique involves difficulties in sufficiently increasing the abrasion resistance of an obtained golf ball due to poor miscibility between the thermoplastic polyurethane elastomer and the thermoplastic polyamide elastomer.

SUMMARY OF THE INVENTION

In view of the above circumstances, it is therefore an object of the present invention to provide a golf ball having a polyurethane cover with excellent abrasion resistance and improved productivity.

In order to achieve this object, the present invention provides a/golf ball comprising a core and a polyurethane cover formed on the core. In this golf ball, the cover is formed of a composition comprising a thermoplastic polyurethane elastomer as a base resin, and the thermoplastic polyurethane elastomer contains a component introduced from a compound having three or more reactive functional groups capable of reacting with an isocyanate group.

The present invention also provides a process for producing a golf ball including a core and a polyurethane cover formed on the core. This process comprises providing a core, and forming the cover on the core by injection molding a cover composition including a thermoplastic polyurethane elastomer, as a base resin, which contains a component introduced from a compound having three or more reactive functional groups capable of reacting with an isocyanate group.

Other features and advantages of the present invention will be apparent from the detailed description.

DESCRIPTION OF THE PREFERRED EMBODIMENTS

A golf ball of the present invention comprises a core and a polyurethane cover formed on the core. The cover is formed of a composition including, as a base resin, a thermoplastic polyurethane elastomer which contains, as its component, a compound having three or more reactive functional groups capable of reacting with an isocyanate group (this compound is hereinafter occasionally referred to as "present compound").

Typically, the thermoplastic polyurethane elastomer is composed of polyisocyanate, polyol and a chain-elongating agent. In the present invention, the compound having three or more reactive functional groups capable of reacting with an isocyanate group is used as one of the member selected from the group consisting of polyol and a chain-elongating agent, preferably used as at least a part of the chain-elongating agent. The present compound as used the elongating agent constitutes a characterising group having three or more bonding lines in the thermoplastic polyurethane elastomer after reacting with an isocyanate compound.

The compound to be used in the present inventions may be a compound having three or more reactive functional groups, such as hydroxyl groups, amino groups, thiol groups or carboxyl groups, which are capable of reacting with an isocyanate group. More preferably, the present compound includes low-molecular-weight polyol, polyamine and amino alcohol. As long as three or more of such reactive functional groups are included in the molecular structure of the present compound, a combination of the reactive functional groups is not limited to a specific type, but any suitable combination, such as a combination of three or more homogeneous reactive functional groups or a combination of three or more heterogeneous reactive functional groups may be used.

The polyol used as the present compound may include: triol, such as glycerin, trimethylolethane, trimethylolpropane, triethanolamine or hexanetriol; tetraol, such as pentaerythritol; and hexaol, such as sorbitol.

The polyamine used as the present compound may include triamine, such as diethylenetriamine or dipropylenetriamine.

For example, the compound having three or more heterogeneous reactive functional groups in its molecular structure includes dimethylol propionic acid, dimethylol butanoic acid and diethanolamine.

Among them, the compound having three or more reactive functional groups capable of reacting with an isocyanate group is preferably triol, more preferably trimethylolpropane. The present compound may be a single kind, or may be two or more kinds to be used in combination.

If the chain-elongating agent is composed only of the present compound, an obtained polyurethane elastomer will exhibit no thermoplasticity in some cases due to excessively increased crosslinking density. Thus, it is recommended to use an additional chain-elongating agent together with the present compound.

The additional chain-elongating agent may be any type having two reactive functional groups capable of reacting with an isocyanate group. For example, it includes low-molecular-weight diol, diamine and amino alcohol.

The low-molecular-weight diol may include diols, such as ethyleneglycol, diethyleneglycol, triethyleneglycol, 1,3-propane-diol, 1,3-butane-diol, 1,4-butane-diol, neo-pentyl glycol, 1,6-hexane-diol, 1,8-octane-diol, aniline-base diol or bisphenol A-based diol.

The diamine may include: aliphatic diamine, such as ethylenediamine or hexamethylenediamine; alicyclic diamine, such as isophoronediamine or piperazine; and aromatic diamine. The aromatic diamine is not limited to a specific type, but may be any aromatic diamine having two amino groups bonded directly or indirectly to an aromatic ring. The term "bonded indirectly to an aromatic ring" means that each of the amino groups is bonded to an aromatic ring, for example, through a lower alkylene group. The aromatic diamine may be mononuclear aromatic diamine having two amino groups bonded to a single aromatic ring, or may be polycyclic aromatic diamine which includes two aminophenyl groups each having at least one amino group bonded to a single common aromatic ring.

For example, the mononuclear aromatic diamine includes: one type having two amino groups bonded directly to a single aromatic ring, such as phenylenediamine, toluenediamine, diethyltoluenediamine or dimethylthiotoluenediamine; and another type having two amino groups each bonded to a single common aromatic ring through a lower alkylene group, such as xylylenediamine. The polycyclic aromatic diamine may be one type having two aminophenyl groups bonded directly to a single aromatic ring, such as diaminobenzene, or may be another type having two aminophenyl groups each bonded to a single common aromatic ring through a lower alkylene group or an alkylene oxide group. Among them, diaminodiphenylalkane group as the type having two aminophenyl groups each bonded to a single common aromatic ring through a lower alkylene group is preferably used. In this type, 4,4'-diaminodiphenylmethane and its derivatives are particularly preferably used.

In view of providing enhanced strength in an obtained cover, it is preferable to use 1,4-butane-diol, 1,8-octane-diol, aniline-base diol or bisphenol A-based diol among the aforementioned additional chain-elongating agents.

In the present invention, on the basis of 100 mass % of the thermoplastic polyurethane elastomer, the content of the chain-elongating agent therein is preferably 3 mass % or more, more preferably 5 mass % or more, and is preferably 20 mass % or less, more preferably 15 mass % or less. Further, on the basis of 100 mass % of the entire chain-elongating agent, the content of the present compound therein is preferably 0.5 mass % or more, more preferably 0.7 mass % or more, further preferably 1.0 mass % or more, and is preferably 10 mass % or less, more preferably 7 mass % or less, further preferably 4 mass % or less. If the content of the present compound is increased out of the above range, a resulting increased crosslinking density in the polyurethane elastomer will be liable to cause deterioration in thermal plasticity and difficulties in injection-molding the cover composition. If the content of the present compound is reduced out of the above range, it will be liable that enhanced resilience and/or abrasion resistance cannot be effectively obtained.

On the basis of 100 mass % of the thermoplastic polyurethane elastomer, the present compound is contained as a component of the thermoplastic polyurethane elastomer preferably at 0.05 mass % or more, more preferably 0.10 mass % or more, further preferably 0.15 mass % or more, and is contained therein preferably at 2.0 mass % or less, more preferably 1.5 mass % or less, further preferably 1.0 mass % or less. The isocyanate used for producing the thermoplastic polyurethane elastomer will be described in detail below. As long as the isocyanate has two or more isocyanate groups, it is not limited to a specific type. For example, the isocyanate is one or a mixture of two or more selected from the group consisting of: aromatic polyisocyanate, such as 2,4-toluenediisocyanate, 2,6-toluenediisocyanate, a mixture (TDI) of 2,4-toluenediisocyanate and 2,6-toluenediisocyanate, 4,4'-diphenylmethanediisocyanate (MDI), 1,5-naphthylenediisocyanate (NDI), 3,3'-bitolylene-4,4'-diisocyanate (TODI), xylylenediisocyanate (XDI), tetramethylxylylenediisocyanate (TMXDI) or para-phenylenediisocyanate (PPDI); alicyclic polyisocyanate or aliphatic polyisocyanate, such as 4,4'-dicyclohexylmethanediisocyanate ($H_{12}$MDI), hydrogenated xylylenediisocyanate ($H_6$XDI), hexamethylenediisocyanate (HDI) or isophoronediisocyanate (IPDI).

In view of improving abrasion resistance, the aromatic polyisocyanate is preferably used as the polyisocyanate constituting the polyurethane. The use of the aromatic polyisocyanate allows an obtained polyurethane to have enhanced mechanical characteristics so as to obtain a cover excellent in abrasion resistance. Further, in view of improving weather resistance, non-yellowing polyisocyanate (TMXDI, XDI, HDI, $H_6$XDI, IPDI, $H_{12}$MDI, etc.) is preferably used, and the 4,4'-dicyclohexylmethanediisocyanate ($H_{12}$MDI) is more preferably used. Because the 4,4'-dicyclohexylmethanediisocyanate ($H_{12}$MDI) has a rigid structure capable of providing enhanced mechanical characteristics in an obtained polyurethane so as to obtain a cover excellent in abrasion resistance.

The polyol used for producing the thermoplastic polyurethane elastomer may include: polyetherpolyol, such as polyoxyethyleneglycol (PEG), polyoxypropyleneglycol (PPG) or polyoxytetramethyleneglycol (PTMG); polymerized polyether-polyol, such as polybutyleneadipate (PBA) or polyhexamethyleneadipate (PHMA); lactone-based polyesterpolyol, such as poly-e-caprolactone (PCL); and polycarbonatepolyol, such as polyhexamethylenecarbonate; and acrylic polyol, and may be a mixture of at least two of the above polyols.

The thermoplastic polyurethane elastomer comprised in the cover composition of the golf ball of the present invention may be synthesized through a conventional method. A synthetic method for the thermoplastic polyurethane may include a one-shot process or a pre-polymer process. The one-shot process is intended to carry out the reaction between polyisocyanate and polyol in a concentrated manner to provide a high molecular weight. The pre-polymer process is intended to carry out the reaction between polyisocyanate and polyol through a plurality of production stages to provide a high molecular weight. For example, the pre-polymer process comprises the steps of synthesizing low-molecular-weight urethane pre-polymer, and successively inducing the reaction between the pre-polymer and the aforementioned chain-elongating agent to provide high molecular weight.

The synthesis of the polyurethane may be performed using a conventional catalyst. For example, this catalyst includes monoamines, such as triethylamine or N,N-dimethylcyclohexylamine; polyamines, such as N,N,N',N'-tetramethylethylenediamine or N,N,N',N'',N''-pentamethyldiethylenetriamine; cyclic diamine, such as 1,8-diazabicyclo[5,4,0]-7-undecene (DBU) or triethylenediamine; and tin-based catalyst, such as dibutyltindilaurate or dibutyltindiacetate.

While the component ratio between the polyisocyanate and the polyol in the polyurethane for use as the base resin of the golf ball of the present invention is not limited to a specific value, the NCO/OH ratio (molar ratio) of the isocyanate group of the polyisocyanate to the hydroxyl group of the polyol is preferably 0.5 or more, more preferably 0.7 or more, particularly preferable 0.8 or more. If the NCO/OH ratio (molar ratio) is less than the lower limit, an insufficient amount of the polyisocyanate component relative to that of the polyol component will be liable to cause deteriorated mechanical characteristics of the urethane and poor hardness of the cover. Further, the NCO/OH ratio (molar ratio) is preferably 1.5 or less, more preferably 1.3 or less, particularly preferable 1.2 or less. If the NCO/OH ratio (molar ratio) is greater than the upper limit, an excessive amount of the polyisocyanate component will be liable to absorb moisture and cause deteriorated mechanical characteristics of the urethane.

In the same way, the NCO/(OH+active hydrogen) ratio (molar ratio) of the polyisocyanate in the polyurethane for use as the base resin of the golf ball of the present invention to the total active hydrogen of the polyol in the polyurethane and the reactive functional groups, such as amino group, in the chain-elongating agent is preferably 0.9 or more, more preferably 1.0 or more, particularly preferable 1.05 or more. Further, the NCO/(OH+active hydrogen) ratio (molar ratio) is preferably 1.5 or less, more preferably 1.4 or less.

The thermoplastic polyurethane elastomer to be used in the present invention is available from BASF Japan ltd.

In addition to the above base resin, the cover composition in the present invention may appropriately contain oil, filler, ultraviolet ray-absorbing agent, coloring agent, anti-aging agent, fluorescent brightening agent or the like, according to need. In this case, it is desired to add these additives to the extent that the properties of the polyurethane cover are not adversely affected thereby. For example, based on 100 mass % of the cover composition, the additive is added to allow the content of the thermoplastic polyurethane elastomer therein to be assured preferably at 95 mass % or more, more preferably 98 mass % or more.

As described above, the cover composition in the present invention employs the thermoplastic polyurethane elastomer as a base resin, and thereby a flow beginning temperature and/or a melt index can be used as a benchmark indicative of the level of thermoplasticity. The flow beginning temperature of the cover composition is preferably 110° C. or more, more preferably 120° C. or more, further preferably 140° C. or more, and is preferably 230° C. or less, more preferably 220° C. or less, further preferably 210° C. or less. If the flow beginning temperature is greater than the upper limit, a molding temperature has to be increased, accordingly. A molding process performed at a high temperature is liable to cause decomposition in the cover composition (urethane bond). If the flow beginning temperature is less than the lower limit, the cover will be likely to soften even at a low temperature or a temperature close to normal or ambient temperature, and excessively high flowability (excessive flow in a mold) will be liable to cause difficulties in molding a golf ball.

As used in the specification, the term "flow beginning temperature" means a temperature initially causing the flow of the cover composition, which is measured by a Koka-type flow tester having an orifice with an inner diameter of 1 mm and a length of 1 mm, under the conditions of load: 588 N (59.96 Kgf) and temperature-rising speed: 3° C./min.

The melt index of the cover composition in the present invention is preferably at least 5 g/10 minutes, more preferably 7 g/10 minutes, further preferably 10 g/10 minutes. The melt index (MI) is a measure of the flowability of a thermoplastic material in its molted state, and the value of the melt index is measured according to the Standard JIS K7210. Specifically, the cover composition is extruded from an orifice under the conditions of temperature: 230° C. and load: 2.16 kg to measure an amount of the extruded composition using a plastometer, and the measured amount is converted into a numerical value represented by g/10 minutes. Generally, a larger value of MI indicates better flowability and processability in the molten state. If the value of MI is less than the lower limit, the resulting deteriorated flowability will be liable to cause difficulties in molding.

The hardness (slab hardness) of the cover composition, which is measured by Shore D hardness after the cover composition is formed in a sheet shape, is preferably 35 or more, more preferably 40 or more, further preferably 42 or more, and is preferably 55 or less, more preferably 52 or less, further preferably 50 or less. If the Shore D hardness of the cover is less than the lower limit, the resilience of the cover will be likely to be deteriorated. If it is greater than the upper limit, the excessively high hardness of the cover will be liable to cause deterioration in shot feeling.

While the thickness of the cover of the golf ball of the present invention is not limited to a specific value, it is preferably 0.3 mm or more, more preferably 0.4 mm or more, further preferably 0.5 mm or more. If the thickness of the cover is less than the lower limit, it will be liable that the intended effects of the cover cannot be obtained. Further, the thickness of the cover is preferably 1.9 mm or less, more preferably 1.6 mm or less, further preferably 1.2 mm or less. If the thickness of the cover is greater than the upper limit, the resilience of the cover will be liable to be deteriorated.

The core of the golf ball of the present invention will be described in detail below.

While the golf ball of the present invention is not limited to a specific structure, it may be a two-piece or multi-piece golf ball having a solid core covered by the cover composition or material, or may be a thread-wound golf ball having a thread-wound core and a cover covering over the thread-wound core. In this case, the solid core may have a single-layer structure or may have a multilayer structure having a center and one or more intermediate layers covering over the center. While each of the solid core in the single-layer structure and the center of the solid core in the multilayer structure is not limited to a specific type, it is preferably a molded body which comprises a rubber composition including a base rubber, a co-crosslinking agent, an organic peroxide, and filler.

The base rubber may be natural rubber and/or synthetic rubber which has been used in conventional solid golf balls. It is preferable to use a high cis-polybutadiene rubber which has a cis-1,4-bond advantageous particularly in resiliency, at least 40% or more, preferably 80% or more. Another type of rubber may be blended in the high cis-polybutadiene rubber. This additional rubber may include natural rubber, polyisoprene rubber, styrene-butadiene rubber, ethylene-propylene-diene rubber (EPDM).

The co-crosslinking agent may be a,β-unsaturated carboxylic acid or its metallic salt, which has a carbon number of 3 to 8, such as acrylic acids, methacrylic acid or their metallic salt. Metal constituting the metallic salt may be preferably monovalent or bivalent metal, such as zinc, magnesium, calcium, aluminum or sodium, particularly preferably zinc. Among them, zinc acrylate is preferably used because it can prove high resiliency. On the basis of 100 parts by mass of the base rubber, the co-crosslinking agent is mixed therein preferably at 10 to 50 parts by mass, more preferably 20 to 40 parts by mass. If the mixed amount is greater than the upper limit, the core will be excessively hardened to cause deterioration in shot feeling. If it is less than the lower limit, the amount of the organic peroxide (described in detail later) has to be increased to compensate for the deteriorated hardness, which leads to deterioration in the resilience and difficulties in obtaining a sufficient golf-ball distance.

The organic peroxide may include dicumylperoxide, 1,1-bis (t-butylperoxy)-3,5-trimethylcyclohexane, 2,5-dimethyl-2,5-di (t-butylperoxy) hexane and di-t-butylperoxide. Among them, dicumylperoxide may be preferably used. On the basis of 100 parts by mass of the base rubber, the organic peroxide is mixed therein preferably at 0.3 to parts by mass t, more preferably 0.4 to 2 parts by mass. If the mixed amount is greater than the upper limit, the amount of the co-crosslinking agent has to be increased to compensate for the deteriorated hardness, which leads to deterioration in the resilience and difficulties in obtaining a sufficient golf-ball distance. If the mixed amount of the organic peroxide is less than the lower limit, the core will be excessively softened, which is liable to cause deterioration in the resilience and difficulties in obtaining a sufficient golf-ball distance.

The filler may be any suitable type capable of being mixed with the core of the solid golf ball. For example, the filler is inorganic filler, such as zinc oxide, barium sulphate, calcium carbonate, magnesium oxide or clay, and these fillers may be appropriately mixed into the core. In addition to such fillers, high-density metallic filler, such as tungsten power or molybdenum powder, may be mixed into the core. On the basis of 100 parts by mass of the base rubber, the filler is mixed therein preferably at 2 to 50 parts by mass, more preferably 3 to 35 parts by mass. If the mixed amount of the filler is less than the lower limit, the weight of the core will not be able to be adequately adjusted. If it is greater than the upper limit, the weight percentage of the rubber component will be excessively reduced, which is liable to cause deterioration in the resiliency.

In addition to the base rubber, the co-crosslinking agent, the organic peroxide and the filler, an organic sulfur compound, an anti-aging agent, and/or peptizer may be appropriately mixed into the rubber composition. On the basis of 100 parts by mass of the base rubber, the anti-aging agent is mixed therein preferably in the range of 0.1 to 1 parts by weight. Further, on the basis of 100 parts by mass of the base rubber, the peptizer may be mixed therein preferably in the range of 0.1 to 5 parts by mass.

The solid core or center in the single-layer structure can be obtained by mixing and kneading the aforementioned rubber compositions, followed by cross-linking and molding them to form a spherical shape in a mold. While the conditions of the crosslinking may be appropriately set up, it is desired to perform the crosslinking typically under a pressure of 2.9 to 11.8 MPa at a temperature of 130 to 180° C. for 10 to 50 minutes.

In case where the solid core is formed to have a multilayer structure, while the one or more intermediate layers covering over the center is not limited to a specific material, it is preferably formed of a molded body made of a rubber composition or thermoplastic resin, such as ionomer. When the molded body with a rubber composition is used as the intermediate layer, this rubber composition may be the same as that as described above. Further, when the thermoplastic resin is used as a base resin of the intermediate layer, it may be ionomer resin, polyethylene, polypropylene, polystyrene, ABS resin, methacrylic resin or polyamide. Among them, it is preferable to use the ionomer resin as the base resin.

The ionomer resin may include a resin prepared by neutralizing a part of carboxylate in a binary copolymer of a-olefin and a,β-unsaturated carboxylic acid with a carbon number of 3 to 8 with a metal ion, or a resin prepared by neutralizing a part of carboxylic acid in a ternary copolymer of a-olefin, a,β-unsaturated carboxylate with a carbon number of 3 to 8 with a metal ion, and a,β-unsaturated carboxylic acid ester. These resins may be used in the form of a mixture thereof to have a desired elasticity and/or rigidity.

The a-olefin in the ionomer resin is preferably ethylene or propylene. The a,β-unsaturated carboxylic acid may include acrylic acid, methacrylic acid, fumaric acid, maleic acid and crotonic acid. Among them, acrylic acid and methacrylic acid are preferably used. The a,β-unsaturated carboxylic acid ester may include methyl, ethyl, propyl, n-butyl and isobutyl ester, for example, of acrylic acid, methacrylic acid, fumaric acid or maleic acid.

The neutralizing metal ion may include: an alkali metal ion, such as sodium, potassium or lithium (monovalent metal ion); a bivalent metal ion, such as magnesium, calcium or zinc; a trivalent metal ion, such as aluminum or neodymium; and their mixtures. Among them, sodium, zinc and lithium are preferably used in view of the resiliency and durability.

A specific example of the ionomer resin includes, but not limited to, Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM 7316 (available from Dupont-Mitsui Polychemicals Co., Ltd), Surlyn 8945, Surlyn 9945, Surlyn 6320, Surlyn 8320, Surlyn AD 8511, Surlyn AD 8512, Surlyn AD 8542 (available from E.I. du Pont de Nemours and Co.), Iotec 7010 and Iotec 8000 (available from Exxon Co.).

These ionomers shown as an example may be used singly or in the form of a mixture of two or more thereof.

While the intermediate layer may consist of the ionomer resin as described above, the ionomer resin may be used in combination with one or more of thermoplastic elastomer and diene-based block copolymer. A specific example of this thermoplastic elastomer may include thermoplastic polyamide-based elastomer (e.g. Trade Name "Pebax 2533": available from Atofina Japan Co., Ltd), thermoplastic polyester-based elastomer (e.g. Trade Names "Hytrel 3548", "Hytrel 4047": available from DUPONT-TORAY Co., Ltd), thermoplastic polyurethane-based elastomer (e.g. Trade Name "Elastollan ET880": available from Basf Japan, Ltd.)

The diene-based block copolymer has a double bond originated by a conjugated diene compound of a block copolymer or a partially hydrogenated block copolymer. The block copolymer serving a base substance of the diene-based block copolymer is composed of a copolymer block A primarily containing at least one kind of vinylaromatic compound, and a copolymer block B primarily containing at least one kind of conjugated diene compound. The partially hydrogenated block copolymer is obtained by hydrogenating the above block copolymer. The vinylaromatic compound constituting the block copolymer may be one, or two or more selected from the group consisting of styrene, a-methylstyrene, vinyltoluene, p-t-butylstyrene and 1,1-diphenylstyrene. Among them, styrene is preferably used. The conjugated diene compound may be at least one member selected from the group consisting of butadiene, isoprene, 1,3-pentadiene and 2,3-dimethyl-1,3-butadiene. Among them, butadiene, isoprene and their combination are preferably used. A preferred example of the diene-based block copolymer includes a block copolymer with a SBS (styrene-butadiene-styrene) structure having a polybutadiene block containing an epoxy group, or a block copolymer with a SIS (styrene-isoprene-styrene) structure having a polyisoprene block containing an epoxy group, A specific example of the diene-based block copolymer may include Trade Name "Epofriend A1010" available from Daicel Chemical Industries, Ltd. and Trade Name "Septon" available from Kuraray Co., Ltd.

On the basis of 100 parts by mass of the base resin, the thermoplastic elastomer and diene-based block copolymer are mixed therein preferably at 1 to 60 parts by mass, more preferably 1 to 35 parts by mass. If the mixed amount is less than the lower limit, the mixing of these components will not be able to bring out intended effects, such as improvement in shot feeling. If it is greater than the upper limit, the layers other than the innermost layer of the core will be excessively softened, which is liable to cause deterioration in resilience and miscibility with the ionomer resin, resulting in poor durability.

A method of coating the intermediate layer onto the center is not limited to a specific manner. Preferably, in case of using a thermoplastic resin, an injection molding process or a compression molding process may be used to coat the thermoplastic resin on the center. In case of using a rubber composition, after coating an unvulcanized rubber composition on the center, the rubber composition may be vulcanized and molded (at 160 to 180° C. for 10 to 20 minutes) in a mold. The surface of the obtained solid core is preferably subjected to a buffing process to provide enhanced contact between the surface and the cover.

The thread-wound core comprises a center and a rubber thread layer formed by winding rubber threads in an elongated state around the center, and any suitable conventional core may be used therefor. The center may be a liquid base (liquid center), or may be a rubber base (rubber center). The rubber threads to be wounded around the center may be the same as those used in thread-wound layers of the conventional thread-wound golf balls. For example, it may be a rubber thread prepared by vulcanizing a rubber composition which contains: either one of natural rubber and a mixture of natural rubber and synthetic polyisoprene; sulfur; vulcanization auxiliary; vulcanization accelerator; and anti-aging agent. The thread-wound core is prepared by winding a rubber thread around the center while stretching the rubber thread about 10 times relative to its original length.

The solid core for use in the golf ball of the present invention is obtained in this manner. The diameter of the solid core is preferably 39 mm or more, more preferably 39.5 mm or more, further preferably 40.8 mm or more, and is preferably 42.2 mm or less, more preferably 42 mm or less, further preferably 41.8 mm or less. If the diameter of the core is less than the lower limit, the cover will have an excessively large thickness to cause difficulties in obtaining sufficient effects from the cover, and in adequately performing a molding process for the cover.

When a load is applied onto the solid core in the range between an initial load of 98 N and a final load of 1275 N, the deformation of the solid core is preferably 2.50 mm or more, more preferably 2.6 mm or more, further preferably 2.7 mm or more, and is preferably 3.20 mm or less, more preferably 3.10 mm or less, further preferably 3.0 mm or less. If the deformation is less than the lower limit, the excessively high hardness will cause increased impact acting on a golfer during ball hitting. If it is greater than the upper limit, the excessively lowered hardness will cause deteriorated resilience to undesirably give to a golfer a heavy feeling in a ball during ball hitting.

As the solid core for use in the golf ball of the present invention, it is preferable to use a core with a surface having a higher hardness than that in the center thereof. Such a solid core with the surface having a higher hardness than that of the center allow a golf ball to be hit out with a high launch angle and a reduced spin of the ball so as to provide an enhanced ball distance. From this point of view, the difference between the respective hardnesses of the surface and center of the solid core for use in the golf ball of the present invention is set preferable at 20 or more, more preferably 25, and is set preferably at 40 or less, more preferably 35 or less. If the difference in hardness is less than the lower limit, the high launch angle and low spin will not be adequately achieved. Thus, a ball distance is liable to be reduced, and the increased impact during ball hitting causes difficulties in obtaining a soft/pleasant shot feeling. If the difference in hardness is greater than the upper limit, the durability of the golf ball will be liable to be deteriorated.

Further, the center hardness of the solid core based on the Shore D hardness is set preferably at 30 or more, more preferably 32 or more, further preferably 35 or more, and is set preferably at 50 or less, more preferably 48 or less, further preferably 45 or less. If the center hardness is less than the lower limit, the excessively lowered hardness will cause deteriorated resilience. If it is greater than the upper limit, the excessively increased hardness will cause deterioration in the shot feeling, reduction in the launch angle, and increase in the ball spin, resulting in reduced ball distance. As used in this specification, the term "center hardness of the solid core" means a hardness value measured at the center of the section prepared by dividing the solid core equally into two, using a spring-type hardness tester type D.

Based on the Shore D hardness, the surface hardness of the solid core for used in the golf ball of the present invention is set preferably at 45 or more, more preferably 50 or more, further preferably 55 or more, and is set preferably at 65 or less, more preferably 62 or less, further preferably 60 or less. If the surface hardness is less than the lower limit, the excessively lowered hardness will cause deterioration in the resilience and the launch angle, and the resulting increased ball spin will be likely to cause reduced ball distance. If the surface hardness is greater than the upper limit, the excessively increased hardness will be likely to cause deteriorated shot feeling. As used in this specification, the term "surface hardness of the solid core" means a hardness value measured at the outer surface of the solid core using a spring-type hardness tester type D. In case where the core has a multilayer structure, the surface hardness of the core means a hardness value of the outermost surface of the core.

A process for producing of a golf-ball of the present invention comprises steps of: providing a core, and forming a cover over the core through an injection molding process using a cover composition including, as a base resin, a thermoplastic polyurethane elastomer which contains, as its component, a compound having three or more reactive functional groups capable of reacting with an isocyanate group. According to this method, an injection molding process can be used to mold the cover. Thus, the productivity of the golf ball and the operationality during the production can be improved. The cover may be formed through the following process:

(i) The cover composition containing the base resin and additives is injected directly onto a core to mold a cover thereon;

(ii) The cover composition is injection-molded in advance using two of half shells each having a hemispherical shape to form two split covers. Then, the two covers are set up to a core in such a manner that the core is wrapped by the two covers, and they are subjected to a compression molding process at 130 to 170° C. for 1 to 5 minutes.

After the body of the golf ball body is prepared by coating the core with the cover, a plurality of depressions, so-called dimples, are typically formed on the surface of the golf ball body. Furthermore, the surface of the golf ball body may be subjected to a polishing treatment, such as sandblasting. Preferably, in order to provide enhanced appearance and commercial value, the golf ball of the present invention is further subjected to a paint finishing and/or marking stamping treatments.

In the present invention, the diameter of the golf ball obtained by coating the core with the cover is preferably 40 mm or more, more preferably 42 mm or more, and is preferably 45 mm or less, more preferably 44 mm or less. To the extent of meeting the standard of United States Golf Association (USGA), in view of reducing air resistance, the diameter is preferably set in the range of 42.67 to 42.8 mm. The mass of the golf ball of the present invention is preferably 44 g or more, more preferably 45 g or more, and is preferably 46 g or less, more preferably 45.93 g or less.

When a load is applied onto the golf ball of the present inventions in the range between an initial load of 98 N and a final load of 1275 N, the deformation of the ball is preferably 2.50 mm or more, more preferably 2.55 mm or more, further preferably 2.6 mm or more, and is preferably 3.10 mm or less, more preferably 3 mm or less, further preferably 2.85 mm or less. If the deformation of the ball is less than the lower limit, the excessively high hardness will provide relatively hard shot feeling. If it is greater than the upper limit, the excessively lowered hardness will cause deteriorated resilience to undesirably give to a golfer a heavy feeling in a ball during ball hitting.

The present invention will be described in more detail in conjunction with Examples. It should be understood that the present invention is not limited to the following Examples, but various modifications can be made without departing from the spirit and scope of the present invention as set forth in appended claims. It is intended that all of such modifications are encompassed within the present invention.

Measurement & Evaluation Method (1) Cover Hardness (Slab Hardness)

A cover composition was formed as a plurality of sheets each having a thickness of about 2 mm through a thermal press forming process, and stored at 23° C. for 2 weeks. The hardness of this sheet was measured using a spring-type hardness tester type D conformable to the Standard ASTM-D2240, while three of the sheets were superimposed together to avoid any influence from a measurement table.

(2) Flow Beginning Temperature (° C.)

A flow beginning temperature of a cover composition was measured using a Koka-flow tester (made by Shimadzu Co.) having an orifice with an inner diameter of 1 mm and a length of 1 mm, under the conditions of load: 588N (59.96 Kgf) and temperature-rising speed: 3° C./min.

(3) Compressive Deformation (mm)

A compressive deformation (deformed amount of a ball in a compression direction) was measured when a load is applied onto a golf ball or a solid core in the range between an initial load of 98 N (10 kgf) and a final load of 1275 N (130 Kgf).

(4) Resiliency Index 200 g of aluminum cylindrical projectile was brought into collision with each of a plurality of balls, and the respective speeds of the cylindrical projectile and the ball before and after collision were measured. A resilient index of each of the balls was calculated based on the measured speeds and the respective masses thereof. The measurement was performed with hitting each of the balls five times, and the measured values were averaged to obtain a measurement result for each of the balls. The resilient coefficient is an index number calculated on the basis of 100 of the resilience coefficient of a golf ball No. 6. A large resiliency index indicates a higher resiliency.

(5) Flight Performance (Ball Distance)

A metal-head number 1 wood (W#1, driving iron) was attached to a swing robot machine made by True Temper, and a club-head speed was set at 50 m/sec. Each of the balls was hit to measure each ball distance. The ball distance was determined by measuring the distance between a first position where the golf ball was hit and a second position where the hit ball finally stopped, and expressed by a index number on the basis of 100 of the ball distance of the golf ball No. 6. The measurement was performed five times with respect to each of the balls, and the measured values were average to obtain a measurement result for each of the balls.

(6) Abrasion Resistance

A commercially available pitching wedge (PW) was attached to the swing robot machine made by True Temper, and two positions of each of the balls were hit, respectively, one time, at a club-head speed of 36 m/sec. The hit positions were visually observed to evaluate and grade into three ranks base on the following criteria.

○: While some scratch is slightly left on the surface of the ball, it is practically negligible.

Δ: A clear scratch is left on the surface of the ball, and some fluff-like fragments are observed on the surface.

x: The surface of the ball is considerably chipped off, and fluff-like fragments are highly observed on the surface.

(7) Melt Index

In conformity to JIS K 7210, a melt index was measured under a load of 2.16 kgf at a temperature of 230° C.

Production of Golf Ball

(1) Production of Core

A core composition containing components mixed together in a mixing ratio as shown in Table 1 was kneaded, and then subjected to a thermal press forming process at 170° C. for 15 minutes in a mold set having two hemispherical mold-halves, to obtain a spherical core having a diameter of 41.2 mm. The obtained core had the compression deformation of 2.95 mm.

TABLE 1

| Mixing Ratio (parts by mass) | | |
|---|---|---|
| polybutadiene rubber | 100 |
| zinc acrylate | 33 |
| zinc oxide | 12 |
| diphenyldisulfide | 0.5 |
| dicumylperoxide | 1 | polybutadiene rubber: Trade Name "BR 18" made by JSR, high cis-polybutadiene (the content of cis-1,4-polybutadiene=96%)

zinc acrylate: Trade Name "ZNDA-90S" made by Nippon Jhoryu Kogyo K.K., zinc oxide: Trade Name "Ginrei R" made by Toho Zinc Co., Ltd.

diphenyldisulfide: made by Sumitomo Seika Chemicals Co., Ltd.

dicumylperoxide: Trade Name "Percumyl D" made by NOF Co.

(2) Preparation of Cover Composition

Cover materials having a mixing ratio as shown in Table 2 were mixed together using a two-axis kneading-type extrusion machine to prepare a pellet-shaped cover composition. The conditions of extrusion: screw diameter=45 mm, screw speed=200 rpm, screw L/D=35. The composition was heated up to 200 to 260° C. at a position of a die of the extrusion machine.

TPU-2 (thermoplastic polyurethane elastomer-2): thermoplastic polyurethane elastomer made by BASF Japan (the ratio of 1,4-butanediol:trimethylolpropane in the chain-elongating agent of Elastollan XNY97A is changed to 99 mass %: 1 mass %)

TPU-3 (thermoplastic polyurethane elastomer-3): thermoplastic polyurethane elastomer made by BASF Japan (the ratio of 1,4-butanediol:trimethylolpropane in the chain-elongating agent of Elastollan XNY97A is changed to 96 mass %: 4 mass %)

TPU-4 (thermoplastic polyurethane elastomer-4): thermoplastic polyurethane elastomer made by BASF Japan (the ratio of 1,4-butanediol: trimethylolpropane in the chain-elongating agent of Elastollan XNY97A is changed to 90 mass %: 10 mass %)

TPU-5 (thermoplastic polyurethane elastomer-5): thermoplastic polyurethane elastomer made by BASF Japan (the ratio of 1,4-butanediol:trimethylolpropane in the chain-elongating agent of Elastollan XNY97A is changed to 85 mass %: 15 mass %)

TPU-6 (thermoplastic polyurethane elastomer-6): thermoplastic polyurethane elastomer made by BASF Japan (the ratio of 1,4-butanediol:trimethylolethane in the chain-elongating agent of Elastollan XNY97A is changed to 96 mass %: 4 mass %)

TPU-7 (thermoplastic polyurethane elastomer-7): thermoplastic polyurethane elastomer made by BASF Japan (the ratio of 1,4-butanediol:hexanetriol in the chain-elongating agent of Elastollan XNY97A is changed to 99 mass %: 4 mass %)

Pebax 5533SNOO: thermoplastic polyether-polyamide elastomer made by Atofina Japan Co., Ltd Hi-milan 1605: sodium ion-neutralized ethylene-methacrylic acid copolymer-based ionomer resin made by Dupont-Mitsui Polychemicals Co., Ltd

TABLE 2

| cover composition | | A | B | C | D | E | F | G | H | I | J |
|---|---|---|---|---|---|---|---|---|---|---|---|
| mixing ratio (parts by mass) | Elastollan XNY97A | — | — | — | — | — | 80 | — | 100 | — | — |
| | TPU-1 | 100 | — | — | — | — | — | — | — | — | — |
| | TPU-2 | — | 100 | — | — | — | — | — | — | — | — |
| | TPU-3 | — | — | 100 | — | — | — | — | — | — | — |
| | TPU-4 | — | — | — | 100 | — | — | — | — | — | — |
| | TPU-5 | — | — | — | — | 100 | — | — | — | — | — |
| | TPU-6 | — | — | — | — | — | — | — | — | 100 | — |
| | TPU-7 | — | — | — | — | — | — | — | — | — | 100 |
| | Pebax 5533SNOO | — | — | — | — | — | 20 | — | — | — | — |
| | Hi-milan 1605 | — | — | — | — | — | — | 50 | — | — | — |
| | Surlyn 9320 | — | — | — | — | — | — | 50 | — | — | — |
| | titanium dioxide | 4 | 4 | 4 | 4 | 4 | 4 | 4 | 4 | 4 | 4 |
| properties | cover hardness (Shore D) | 48 | 48 | 49 | 50 | 52 | 48 | 48 | 47 | 49 | 50 |
| | flow beginning temperature (° C.) | 155 | 183 | 201 | 224 | 238 | 133 | — | 131 | 210 | 220 |
| | MI (g/10 minutes) | 27 | 23 | 19 | 10 | 5 | 11 | 8 | 9 | 16 | 13 |

Elastollan XNY97A: thermoplastic polyurethane elastomer made by BASF Japan, (polyol; polytetramethyleneglycol, chain-elongating agent; 1,4-butanediol, isocyanate compound; 4,4'-dicyclohexylmethanediisocyanate TPU-1 (thermoplastic polyurethane elastomer-1): thermoplastic polyurethane elastomer made by BASF Japan (the ratio of 1,4-butanediol:trimethylolpropane in the chain-elongating agent of Elastollan XNY97A is changed to 99.5 mass %: 0.5 mass %)

Surlyn 9320: made of zinc ion-neutralized ethylene-methacrylic acid-n-butylene acrylate ternary copolymer-based ionomer resin made by E.I. du Pont de Nemours and Co.

(3) Preparation of Cover

The obtained cover composition was formed as two hemispherical half shells through an injection molding process. The core prepared as described above was wrapped by the two half shells, and they were subjected to a thermal press forming process at a temperature as shown in Table 3 for 2 minutes in a mold, to form a cover layer. The obtained golf ball was taken out of the mold, and burrs were removed therefrom. Then, the surface of the ball was coated with clear paint. In this manner, golf balls No. 1 to 10 each having a diameter 42.8 mm and a mass of 45.4 g were obtained. Based on the aforementioned evaluation/measurement method, the compressive deformation, resilience coefficient, ball distance and abrasion resistance of each of the balls were evaluated. The result is shown in Table 3.

TABLE 3

| | Ball No. | | | | | | | | | |
|---|---|---|---|---|---|---|---|---|---|---|
| | 1 | 2 | 3 | 4 | 5 | 6 | 7 | 8 | 9 | 10 |
| Type of Cover | A | B | C | D | E | F | G | H | I | J |
| Molding Temperature (° C.) | 160 | 190 | 210 | 230 | — | 160 | 160 | 150 | 220 | 230 |
| Compressive Deformation (mm) | 2.82 | 2.80 | 2.77 | 2.74 | — | 2.84 | 2.81 | 2.85 | 2.75 | 2.72 |
| Resilience Coefficient | 101 | 103 | 104 | 105 | — | 100 | 94 | 96 | 104 | 104 |
| Ball Distance (m) | 103 | 105 | 108 | 110 | — | 100 | 93 | 97 | 108 | 108 |
| Abrasion Resistance | Δ | ○ | ○ | ○ | — | X | X | X | ○ | ○ |

In the golf ball Nos. 1 to 5 and 9, 10, thermoplastic polyurethane elastomer constituting the cover contains, as its component, a compound having three or more reactive functional groups.

Among these balls, each of the golf balls No, 1 to 4 and 9, 10 has adequate abrasion resistance. Further, the golf balls No, 1 to 4 and 9, 10 are excellent in all of other ball characteristics (compressive deformation, resilience coefficient, ball distance). It is believed that these excellent characteristic can be obtained from a 3-dimensional crosslinked structure in the cover formed by the compound having three or more reactive functional groups capable of reacting with an isocyanate group.

By contrast, the golf ball No. 5 as a sample where the compound having three or more reactive functional groups is contained at an excessive amount could not be formed as a golf ball due to less flowability of the cover compound caused by exceeding crosslinking reaction.

The golf ball Nos. 6 to 8 are samples which contain no compound having three or more reactive functional groups in the base resin of the covers. The golf ball 6 has exhibited inferior abrasion resistance due to poor miscibility between the thermoplastic polyurethane elastomer and the thermoplastic polyether-polyamide elastomer. The golf ball 7 is a sample using only ionomer resin as the base resin, and the golf ball 8 is a sample using only the thermoplastic polyurethane elastomer (without the compound having three or more reactive functional groups). These balls exhibited inferior abrasion resistance, and poor resilience and ball distance.

This application is based on Japanese Patent Application No.2003-352764 filed on Oct. 10, 2003, the contents of which are hereby incorporated by references.

What is claimed is:

1. A golf ball comprising a core and a polyurethane cover formed on said core, wherein said cover is formed of a composition comprising a thermoplastic polyurethane elastomer as a base resin, and said thermoplastic polyurethane elastomer contains a polyether polyol and a chain-elongating component including a reactive compound having three or more reactive functional groups capable of reacting with an isocyanate group, a content of said compound being 4 to 10 mass % on the basis of 100 mass % of said component.

2. A golf ball according to claim 1, wherein said thermoplastic polyurethane elastomer contains said reactive compound in an amount of 0.15 mass % to 2.0 mass % on the basis of 100 mass % of said thermoplastic polyurethane elastomer.

3. A golf ball according to claim 1, wherein said reactive compound is a triol.

4. A golf ball according to claim 1, wherein said composition has a flow beginning temperature of 110° C. to 230° C.

5. A golf ball according to claim 2, wherein said reactive compound is a triol.

6. A golf ball according to claim 2, wherein said composition has a flow beginning temperature of 110° C. to 230° C.

7. A golf ball according to claim 3, wherein said composition has a flow beginning temperature of 110° C. to 230° C.

8. A golf ball according to claim 5, wherein said composition has a flow beginning temperature of 110° C. to 230° C.

9. A process for producing a golf ball including a core and a polyurethane cover formed on said core comprising:

providing a core, and covering said core with a cover composition by injection molding, wherein said cover composition includes as a base resin a thermoplastic polyurethane elastomer containing a polyether polyol and a chain-elongating component including a reactive compound having three or more reactive functional groups capable of reacting with an isocyanate group, a content of said compound being 4 to 10 mass % on the basis of 100 mass % of said component.

10. A process according to claim 9, wherein said thermoplastic polyurethane elastomer contains said reactive compound in an amount of 0.15 mass % to 2.0 mass % on the basis of the 100 mass % of said thermoplastic polyurethane elastomer.

11. A process according to claim 9, wherein said reactive compound is a triol.

12. A process according to claim 9, wherein said composition has a flow beginning temperature of 110° C. to 230° C.

13. A process according to claim 10, wherein said reactive compound is a triol.-

14. A process according to claim 10, wherein said composition has a flow beginning temperature of 110° C. to 230° C.

15. A process according to claim 11, wherein said composition has a flow beginning temperature of 110° C. to 230° C.

16. A process according to claim 13, wherein said composition has a flow beginning temperature of 110° C. to 230° C.

17. A golf ball according to claim 1, wherein said component is a mixture of said reactive compound and at least one member selected from the group consisting of a diol, diamine and amino alcohol.

18. A golf ball according to claim 17, wherein said reactive compound is a triol.

19. A gold ball according to claim 17, wherein said composition has a flow beginning temperature of 110° C. to 230° C.

20. A process according to claim 9, wherein said component is a mixture of said reactive compound and at least one selected from the group consisting of a diol, diamine and amino alcohol.

21. A process according to claim 20, wherein said reactive compound is a triol.

22. A process according to claim 20, wherein said composition has a flow beginning temperature of 110° C. to 230° C.

* * * * *